United States Patent
Klemm et al.

(10) Patent No.: US 6,375,228 B1
(45) Date of Patent: Apr. 23, 2002

(54) COUPLING UNITS CONNECTING TUBULAR MEMBERS HAVING A HARDENED INNER WALL FOR CARRYING MECHANICALLY ABRASIVE FLUID CONCRETE

(75) Inventors: Robert E. Klemm, Cedarburg; Gary D. Lehnhardt, Cedar Grove, both of WI (US)

(73) Assignee: Construction Forms, Inc., Port Washington, WI (US)

( * ) Notice: Subject to any disclaimer, the term of this patent is extended or adjusted under 35 U.S.C. 154(b) by 0 days.

(21) Appl. No.: 09/276,775

(22) Filed: Mar. 25, 1999

(51) Int. Cl.$^7$ .................................................. F16L 23/00
(52) U.S. Cl. .................. 285/47; 285/288.1; 285/288.2; 285/112; 285/364
(58) Field of Search ............................ 285/41, 47, 416, 285/288.2, 288.1, 222.1, 112, 364

(56) References Cited

U.S. PATENT DOCUMENTS

| | | | | |
|---|---|---|---|---|
| 2,137,097 A | * | 11/1938 | Sateren | 285/416 |
| 3,516,690 A | * | 6/1970 | Kreig | 285/288.2 |
| 4,784,413 A | * | 11/1988 | Hashimoto | 285/416 |
| 5,044,670 A | * | 9/1991 | Esser | 285/416 |
| 5,275,440 A | * | 1/1994 | Esser | 285/416 |
| 5,813,437 A | * | 9/1998 | Esser | 285/416 |
| 6,086,109 A | * | 7/2000 | Esser | 285/416 |

FOREIGN PATENT DOCUMENTS

| | | | | |
|---|---|---|---|---|
| DE | 660065 | * | 5/1938 | 285/422 |
| DE | 2549282 | * | 5/1977 | 285/416 |
| DE | 4025652 | * | 5/1991 | 285/416 |

* cited by examiner

Primary Examiner—Eric K. Nicholson
(74) Attorney, Agent, or Firm—Andrus, Sceales, Starke & Sawall, LLP

(57) ABSTRACT

A concrete flow line made up of a plurality of end to end pipe sections with pipes connected to each other by a coupling assembly provides for carrying abrasive fluid concrete to a deposit site. The coupling assembly includes an insulating thin sleeve slid over the connecting end of the pipe and spaced from the pipe to form a heat insulating air space therebetween. The thin sleeve is welded to the pipe prior to the hardening of the pipe. After the sleeve is welded in place the inner wall of the pipe is hardened using an induction coil for concentrating of the heat within the inner wall portion in combination with a quenching unit to affect the desired hardening while maintaining an outer ductile wall portion to which the sleeve has been actually welded. A clamping collar or coupler is welded to the sleeve after hardening and forms a connecting end for receiving of a clamp unit which interconnects the adjacent pipe and pipe sections. An elongated raw material pipe of a length which is a multiple of the pipe section in length is provided. A plurality of sleeves are slid over the pipe in appropriate spaced relation and welded to the raw pipe. The elongated raw pipe is then hardened to form the inner hardened wall with the outer ductile wall to which the sleeves are then already welded. The sleeve itself may be slightly hardened as a result of the hardening of the pipe and contribute to the further wear resistant characteristics at the junction end in the pipe line. The elongated pipe is then cut using a plasma torch along with the attached sleeve to form a precise planar cut, defining a precise length of the pipe and thereby provide a plurality of pipe sections. Thereafter the collar is slid or telescoped over the end of the sleeve and welded in place. The sleeve with the spacement effectively isolates the heat in the collar during welding from the hardened pipe to maintain the desired pipe characteristic.

25 Claims, 4 Drawing Sheets

COUPLING UNITS CONNECTING TUBULAR MEMBERS HAVING A HARDENED INNER WALL FOR CARRYING MECHANICALLY ABRASIVE FLUID CONCRETE

FIELD OF THE INVENTION

Background of the Invention

This invention relates to a tubular member having an end coupler collar unit and particularly to a tubular member having a hardening wall for transport of mechanically abrasive and wear-creating fluid materials, in particular, fluid concrete.

Concrete pumping systems are used in placement of concrete in various applications. The present invention has been particularly applied to the concrete pumping technology but may of course be used in other pipe lines which transport like highly mechanically abrasive material. In boom mounted units, the booms are formed of tubes to form a part of the pumping line. Hereinafter, pipe is generically used to include any tubular member which is interconnected to form a part of the line. In concrete pumping, excessive wear of the pipe is a common problem, and a special problem at the coupling of the pipe sections, particularly where there is a change of flow direction.

As is well known in the art, to minimize the necessity for frequent replacement of pipe sections and particularly elbows, the pipe may be specially formed with an inner wall to withstand an abrasive characteristic, such as by specially hardening of the inner wall of the pipe or providing a highly abrasive resistance inner liner, generally including a hardened inner steel member, a suitable ceramic liner material or the like material which are abrasive resistant. An advantageous dual metal wall structure which provides a hardened and high wear resistant inner liner is disclosed in the U.S. Pat. No. 5,097,585 which issued Mar. 24, 1992 to the assignee of this invention. A similar single wall pipe is disclosed in U.S. Pat. No. 5,379,805 which issued Jan. 10, 1995.

In concrete pumping systems, initial pipe sections are interconnected to each other with releasable couplings. A typical system is disclosed in U.S. Pat. No. 3,705,737, which issued Dec. 1, 1972 and U.S. Pat. No. 4,305,607 which issued Dec. 15, 1981, to the assignee of this invention. The couplings of the pipes generally in present technology include a multiple part releasable clamp assembly such as a hinged C-shaped clamp or a bolted clamp unit and the like with a sealing gasket located within the coupling to seal the joint between slightly spaced pipe ends of the line. Thus, the pipe ends will normally be spaced slightly from each other and sealed by the outer special gasket structures. The pipe ends universally include an end body member or collar which has an annular groove, with the side edges of the U-shaped clamp members fitting within the grooves and locking the pipes to each other. Where a change of direction is required in the flow of the concrete, elbow sections are similarly connected to the straight pipe sections.

All pipe connections present areas which are particularly subject to significant wear as a result of abrasive characteristic of concrete, and will exist with other mechanically abrasive semi-solid flowing materials. The area of each pipe coupling presents on areas of significant weakness. The pipe elbows in the flow system also present a particularly severe area of wear at the outer elbow wall facing the oncoming stream of concrete as a result of the continuous engagement of the solid particles within the concrete or other particle borne fluid moving into turning engagement with such wall.

In connection with attaching the end collar assemblies or units to heat-treated tubes or pipes that will form a section of a concrete pumping line, the prior art has otherwise uniformly heat-treated the pipe or tube proper to harden the inner wall and thereafter welded the collar assembly or unit to the hardened pipe. Welding of the collar assembly or unit to the heat-treated pipe or tube however, results in tempering of the hardness of the inner wall of the heat-treated pipe or tube and thereby decreases the wear resistance of the inner wall to the abrasive affects of the flowing concrete. Applicant has found that the problem is particularly critical in thin wall pipe which generally are known in the concrete pump art as solid wall pipes having a thickness of about one quarter inch or less as well as some of the new higher hardness type products.

In the concrete pumping art, the assignee of this invention has made available an improved end coupler unit which significantly increases the life of the coupler unit, permits on-site reconstruction of the coupler unit for continued functioning of the pipe. Generally, in the above coupler unit, a special hard wear-resistant insert liner is formed of a special hardened material, such as a special carbide material, a special ceramic material or the like. The hard wear-resistant insert liner is secured within a recessed end of the collar of the coupler unit. The insert liner is adhesively bonded in place and subject to release, using heat or another operative energy field to soften or otherwise effectively release the adhesive and permit ready removal of the insert liner as well as the adhesive. The liner maintains a highly wear resistant end in the pipe section at the interface between the two connected pipe sections, as well as creating a system for rapid and cost effective end replacement structure for extending the life of the pipe section.

Another solution which has been considered is to heat treat the pipe after the collar end is first welded in place. Applicant has found that this process eliminates or minimizes the heat effective zone with respect to hardening but problems arise due to length variance of the pipe sections. Thus, the hardening operation after welded attachment of the collar causes the microstructure of the pipe material to grow in size. This growth is erratic because the pipe product is not entirely converted to a martensite and the hardness profile may vary throughout he wall of the product. Experience with such forming of pipe without a heat effected zone has resulted in variations of +/−3/16 inches in a ten foot tube or pipe. Such a length variation is generally unacceptable in present day system.

Thus, although the various problems have been well recognized and various solutions suggested and used, there is a continuing need for cost effective solution to the problem of the wear characteristic created by the flow of abrasive materials, particularly at the pipe connecting points.

SUMMARY OF THE INVENTION

The present invention is directed to a simple structure and a manufacturing system for isolation of the heat created during the welding the collar assembly or unit to the heat-treated pipe or tube. This heat isolation is essential in order to maintain optimum performance of the heat-treated pipe or tube. Generally, in accordance with this invention an isolating member is interposed between the hardened pipe and the welded collar. Generally, in a preferred construction, a thin tubular sleeve member is welded to the raw pipe which is then hardened. The assembly is preferably formed of a greater length than the final length and cut to a precise length after welding the sleeve to the pipe. The coupling collar or other connecting member is then telescoped or slid over the outer end of the sleeve and welded to the sleeve. The isolation member or sleeve prevents the heat created during the welding of the collar in position from adversely affecting the hardness of the basic heat-treated pipe structure by creating a heat isolation gap between the heat-treated pipe or tube and the sleeve. More particularly in accordance a practical and preferred construction of the present invention, a plurality of the pipe sections are formed from an elongated raw material pipe. The raw material pipe is equal in length to a substantial multiple of the individual pipe sections. A number of the short isolation sleeves are slipped over the elongated pipe at appropriate spacings. The plurality of so aligned sleeves are then welded to the raw material pipe. Only after such welding is the raw material pipe subject to hardening preferably through a system utilizing induction in coils with an inner quench head, with the hardening, of only the inner pipe portion. This also results in some hardening of the sleeve. As this also provides an additional hardened material in the area of the connection which is an area of significant wear, it provides for an improved and rigid joint connection in such preferred construction. A preferred system is fully disclosed in the U.S. Pat. No. 5,379,805 and is assigned to the assignee of the present invention. Because the welds were made prior to heat treating of the pipe, the weld of the sleeves does not affect the metallurgical properties of the inner hardened surface and wall portion. After the processing, the hardened pipe or tube and sleeve assembly is cut to the required lengths. Cutting is preferably provided utilizing with present day technology, a plasma torch. The plasma torch cutting is a very rapid system which minimizes any heat input to the structure being cut. A plasma torch also yields a very accurate and final length without affecting the hardened inner wall portion.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
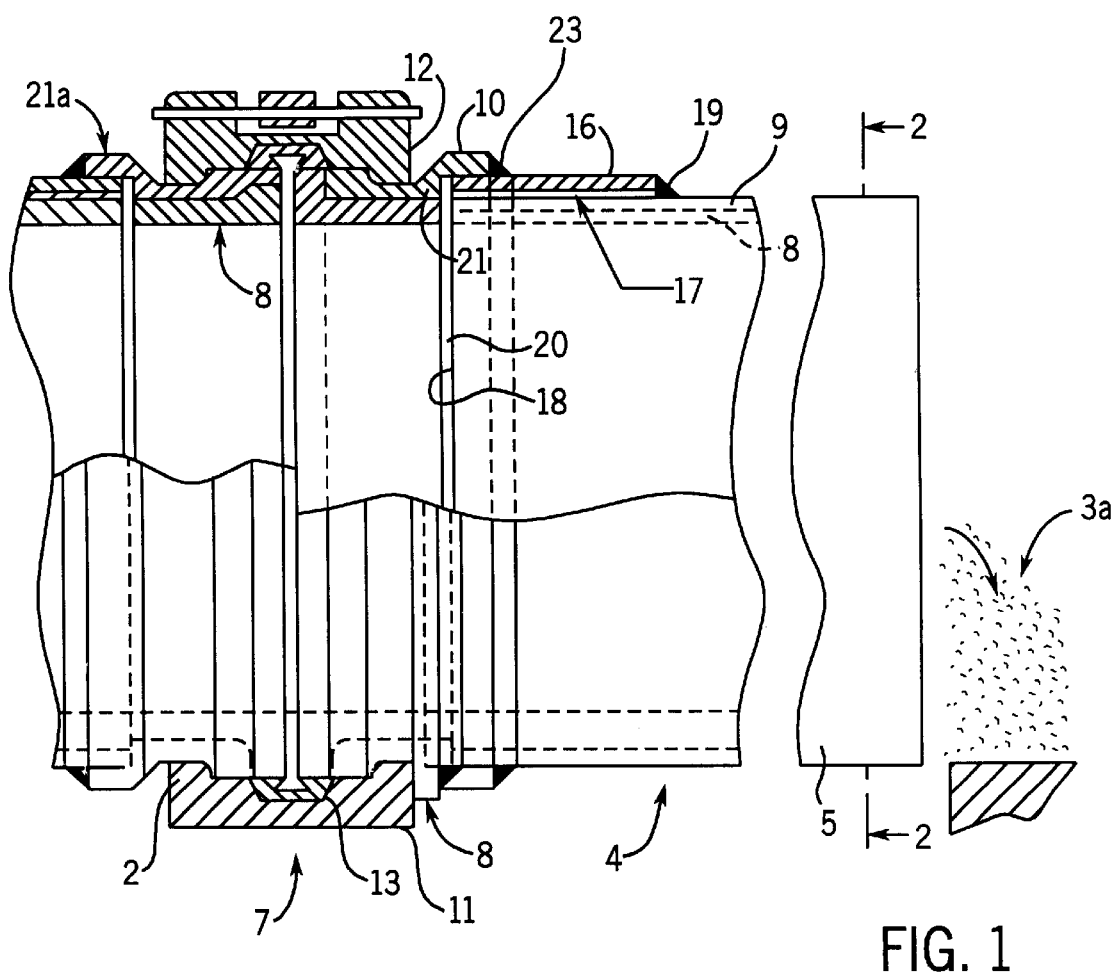
FIG. 1 side elevational view of adjacent pipe sections including an elbow section releasably coupled to a straight line pipe section, with a coupling assembly constructed in accordance with the teaching of the present invention joining the pipe sections in a concrete pumping line.

Referring to the drawings and particularly FIG. 1, a diagrammatic illustration of a concrete pumping system is illustrated incorporating a plurality of pipe sections constructed in accordance with the present invention, and illustrating one preferred embodiment of the present invention.

In FIG. 1 a concrete pump 1 has a high pressure outlet 2 for establishing a fluid concrete flow under a relatively high pressure, typically on the order of 3,000 pounds per square inch (psi), through a flow line 3. The concrete is transported by the flow line 3 from the pump source at a central location to one or more placement locations. Such systems are presently widely known. Generally the flow line 3 includes a plurality of individual pipe sections 4 which are connected to each other in line. In FIG. 1 a portion of the flow line is shown including a straight pipe 5 of a pipe section 4 connected to an elbow pipe 6 of another pipe section 4. The sections 4 are formed with special ends which are connected to each other by a releasable coupling unit 7.

Figure 5:
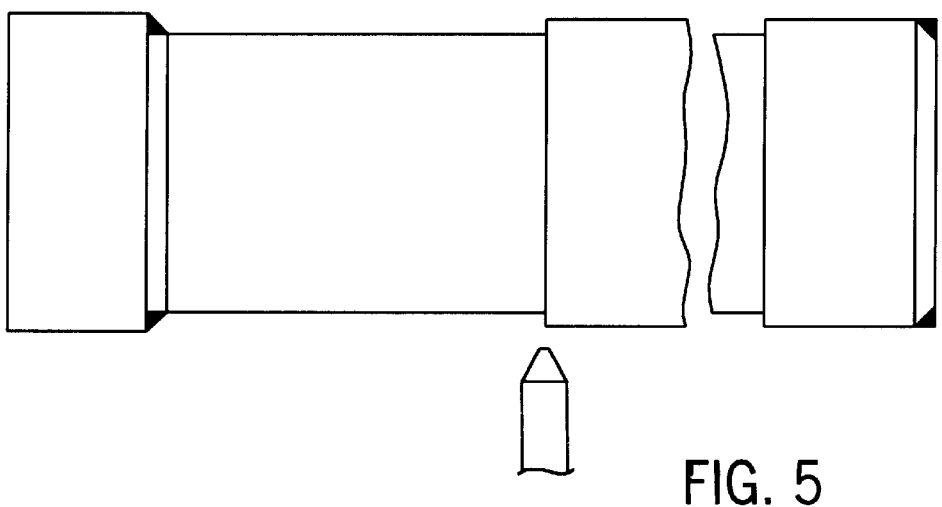
FIG. 5 is a view similar to FIG. 4 illustrating the final process of the pipe sections.

The pipes 5 and 6 as well as the other pipes in the line are often heat treated steel pipes to produce a hardened inner pipe wall portion 8 with an outer high strength ductile outer wall portion 9. This construction is used because of the highly abrasive mechanically abrasive characteristic of flowing concrete and of course is well known in the art. A particularly satisfactory method of forming a hardened inner pipe is more fully disclosed in U.S. Pat. No. 5,379,805 in which a single wall pipe is processed using an induction heating unit in combination with a quenching unit for hardening of the inner wall of a pipe for use in concrete pumping or the like. The system is shown in FIG. 5 illustrating a preferred method of forming the illustrated embodiment. Alternative systems have also suggested the use of dual wall pipes with an inner hardened pipe and an outer ductile pipe section or portions interconnected to each other through a special process and heat treatment. A dual wall pipe for concrete pumping lines is for example, disclosed in U.S. Pat. No. 5,097,585.

Although the present invention has been particularly applied in the illustrated embodiment of the invention to a single wall pipe, the pipe may take any other form such as a dual wall pipe or other hardened pipe which has the characteristics and requirements as set forth herein.

The illustrated coupling unit 7 includes a unique collar unit or assembly 10 secured to the respective ends of the pipes 5 and 6. The coupling unit 7 further includes an encircling clamp unit 11 which engages the respective collar units 10 and rigidly clamps the pipe ends to each other to form a substantially rigid pipe line through the pipe sections. The pipe coupling unit is basically similar to that widely used in the concrete pumping art and the like. Referring to Fig., the clamp unit 11 is a multiple part unit, typically a two part unit which encircles the pipe sections. It has a basic U-shaped cross section defining an inner cavity between side arms 12 which mate with encircling grooves in the collar units 10 on each of the pipe ends. The closed clamp unit 11 rigidly interconnects the pipe ends to each other. The cavity bridges the gap between the ends of the pipes 5 and 6. An expandable or flexible seal unit 13 is held within the cavity with the opposite side arms of the seal unit abutting the ends of the outer end portions of the pipe. In practice, concrete is allowed to flow between the pipe ends into the cavity of the seal unit 13 to form a fluid tight seal to maintain a continuous flow through the pipes 5 and 6. This basic structure is well known in the art and suitable encircling clamp unit can be readily provided by those skilled in the art similar to that described as well as other well known clamp units.

Uniformly, in the concrete pumping art, the end coupling collar unit on assembly 10 is attached as by welding to the end of each pipe section. It is formed of a suitable steel material and construction to withstand the forces of the clamping unit and preferably specially constructed to withstand the highly abrasive characteristic of the concrete flowing through the line under high pressure.

The collar unit 10 as disclosed herein illustrates a preferred construction in accordance with the teaching of the present invention and in particular in which the collar unit is secured while maintaining the hardened inner wall of the interconnected pipe. This structure significantly increases the quality and life of the pipe sections by maintaining a high quality interconnection at the junction of the pipe sections and without adversely affecting the inner hardened wall of the pipe.

Figure 2:
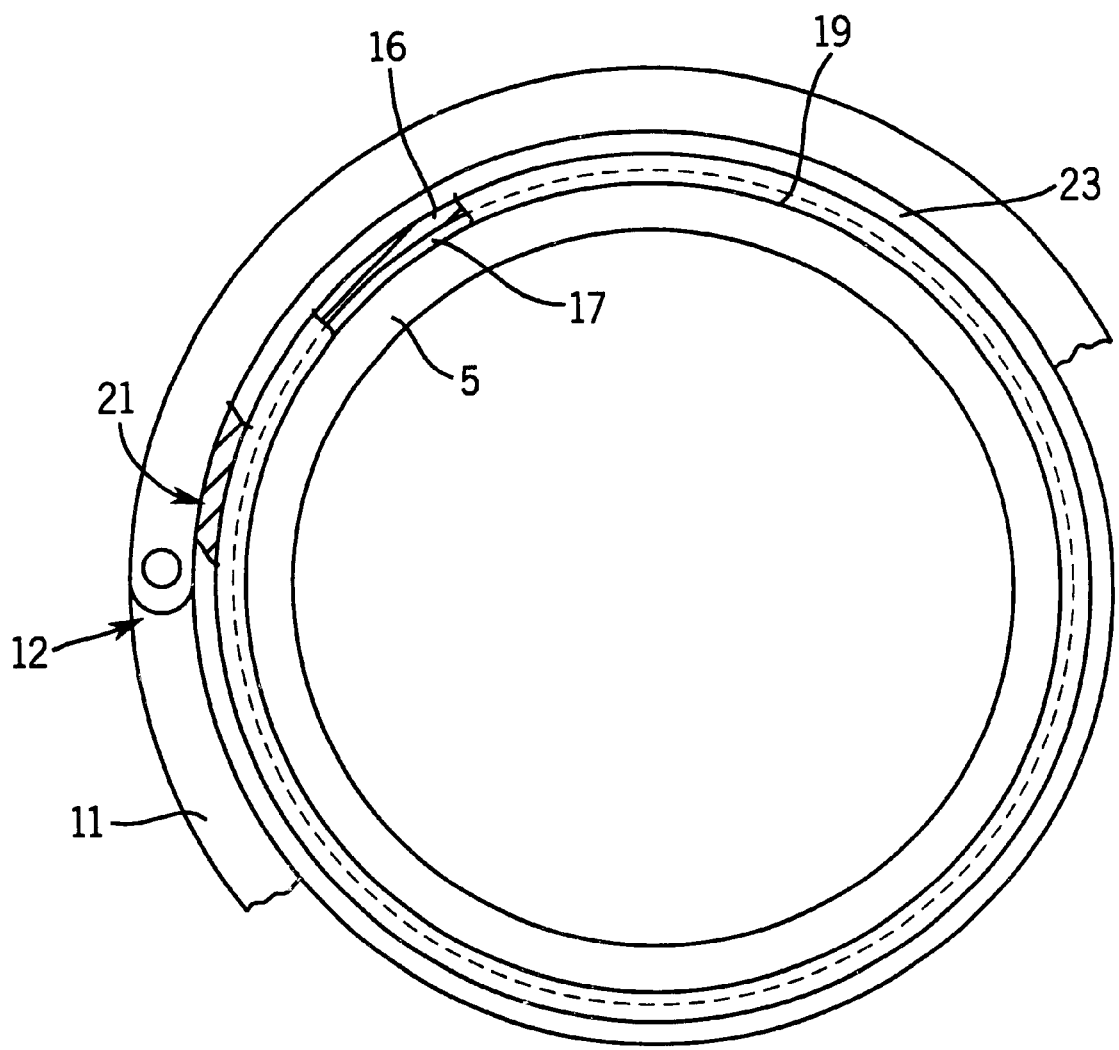
FIG. 2 is an enlarged view taken generally on line 2—2 of FIG. 1.
Figure 3:
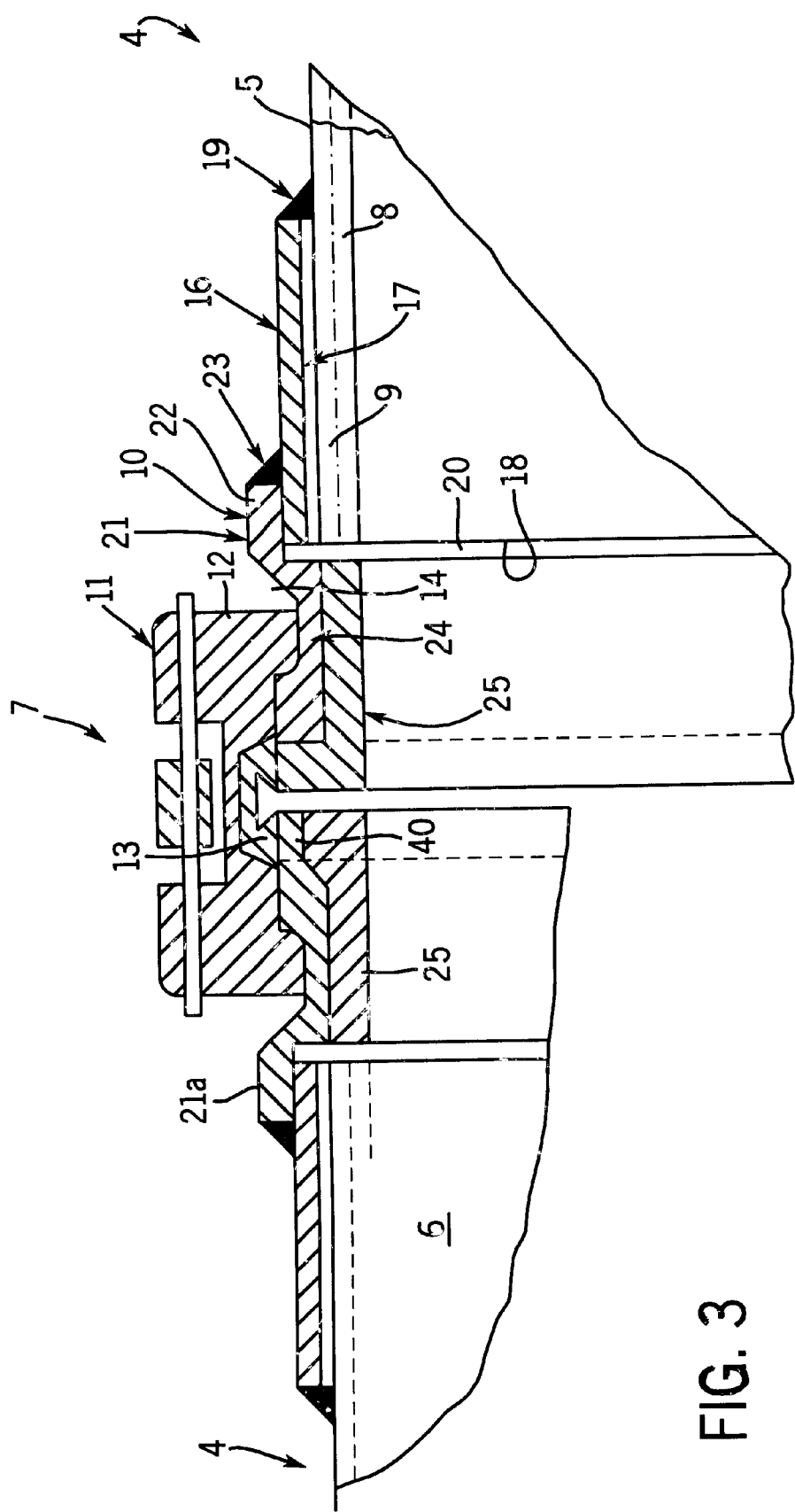
FIG. 3 is an enlarged fragmentary view of the coupler assembly, in section, to more clearly illustrate the detail of the coupling assembly.
Figure 4:
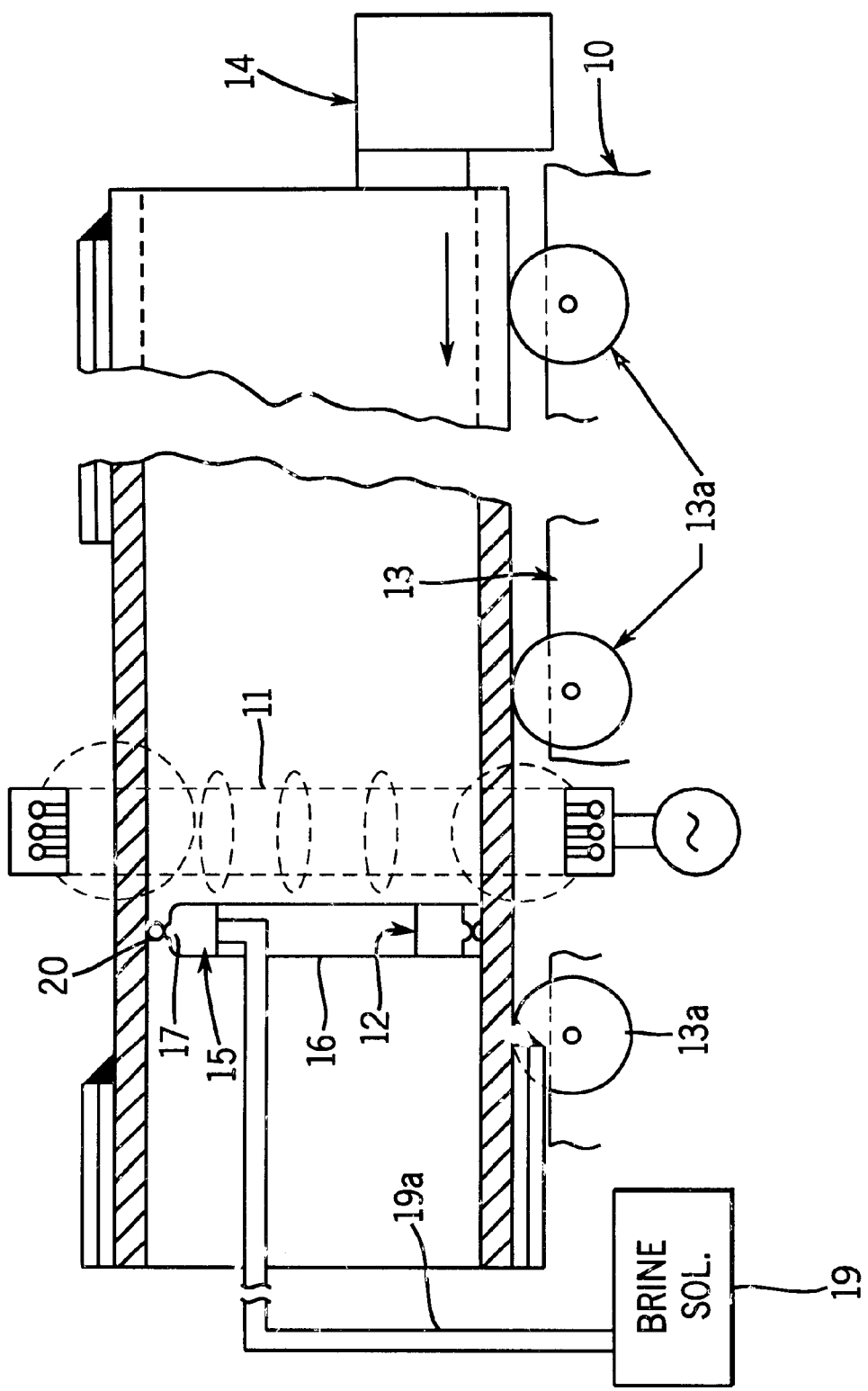
FIG. 4 is a view illustrating a method of heat treating the straight pipe sections in a line for pumping concrete.

Turning particularly to FIGS. 2–4, the collar unit 10 attached to the pipe 5 is shown and described in detail. The corresponding parts of the collar unit 10 applied to the elbow pipe 6 are identified by corresponding primed numbers for clarity and simplicity of explanation.

As shown in FIGS. 1 and 2, pipe 5 is a single wall member formed with a constant inner diameter and with the collar unit 10 secured to the exterior wall of pipe 5 immediately adjacent the end thereof. The single wall pipe 5 is shown with the heat treated inner portion 8 forming a hardened inner wall portion. The encircling outer portion 9 is a significantly more ductile portion and forms a high strength outer wall. The inner wall portion 8 forms a greater portion of the thickness but as in any hardening process there will be gradual transition into the outer ductile wall portion, in accordance with generally accepted and known practice.

A typical hinged clamp unit 11 with a toggle arm is illustrated as shown in U.S. Pat. No. 4,311,248 with a U-shaped arm members 13 mating with recesses or grooves 14 formed directly into a collar unit 10.

Referring particularly to FIGS. 1 and 3, the collar assembly or unit 10 includes an outer sleeve 16 which extends and is telescoped over the end portion of the pipe 5, with an air gap 17 therebetween. The axially outer ends of sleeve 16 and pipe 5 are located in a common plane 18. The telescoped inner end of the sleeve 16 is secured to the outer wall of pipe 5 by a weld 19 to rigidly and fixedly secure the sleeve to the pipe 5.

The sleeve 16 is welded to the pipe with the air gap 17 between the sleeve and the pipe. The air gap 17 is shown as a very distinct air gap. In fact, it can be formed with a relatively slight air gap and in fact may include some actual interengagement between the outer wall of the pipe 5 and the inner wall of the sleeve. The sleeve is significant in inhibiting transfer of heat into the hardened pipe 5 during the welding of a collar to the pipe 5, as previously described. Welding of the sleeve causes expansion which opens the air gap between the sleeve and the pipe. Although the sleeve thickness is not critical, a sleeve thickness of 0.125 inches has been used in a typical collar. The additional wall thickness further inhibits the conduction of welding heat to the hard surface.

The sleeve 16 is welded in place prior to the heat treating of the pipe 5 to form the hardened inner wall portion 8 and the ductile outer wall portion 9 to avoid adversely affecting the wall characteristic as a result of the heating of the pipe 5 during the forming of weld 19. A conventional semi-automatic arc welding process provides a highly satisfactory connection.

As a side benefit of the proceeding, during the heat treating operation to harden the inner wall of the pipe 5, the outer sleeve 16 will also acquire some hardness and strength. Such increases will further enhance the joint reliability, while also providing an additional amount of raw material for wear. In other words, the sleeve/pipe junction provides extra material thickness directly behind the coupling connection. This is significant in that this is the area of greatest abrasive wear as a result of the turbulence caused by any slight offset which often occurs when connections are made.

A separate collar 21 is secured to the sleeve 16 as an extension of the pipe 5 after heat treating of the raw pipe 5 with the sleeve 16 in place. The illustrated collar 21 is a solid steel tubular member which includes a first circular and grooved body member or portion 22 extended over the end of the sleeve 16 for a short distance. A weld 23 rigidly fixes the collar 21 to the outer end portion of the sleeve. The grooved body portion 24 of the collar projects outwardly and inwardly of the pipe, with a slight space or gap 20 from the coplanar end 18 of the pipe 5 and the sleeve 16. The body portion 24 first includes the outer recess or groove 14 for receiving the clamp side walls or edges of the clamp unit 11. In the illustrated embodiment of the invention, the collar 21 further includes an L-shaped insert liner 25 affixed to and abutting the outer end of the body portion 24 and the inner wall of the body portion 24. The liner is a generally L-shaped member which is adhesively bonded to the collar, as by an adhesive, (not shown) between the interface to form a fixed but releasable interconnection therebetween. The liner has an inner diameter essentially corresponding to the inner diameter of the pipe 5, and is preferably constructed in accordance with the well known structure manufactured and sold by the assignee of this application, Construction Forms, Inc. of Cedarburg, WI. The insert is formed of a special hardened material and is replaceable to increase the operating life of the pipe 5.

Any other type of a collar can of course be employed.

An alternate embodiment for the collar is shown attached to the sleeve on pipe 5. In this embodiment, collar 21a includes an extension 40 that extends over liner 25 so that the outer end of collar 21a is coplanar with the outer end of liner 25.

Applicant has found that the direct welding of the collar member 22 directly to the pipe 5 even with a water quench, particularly on thin wall pipe, always transfers significant welding temperature onto and into the inner surface portion of a thin walled pipe. This significantly reduces the hardness and wear resistance to the abrasive characteristic of the concrete, and this is true even where a water quench is used during the welding of the collar to the pipe. Thus, in essence, the short exterior sleeve 16 significantly if not completely eliminates any adverse effect of the outer collar welding operation to rigidly secure the collar in place. Although shown with the collar secured to one end of a pipe section, a similar collar assembly is provided at both ends of each section for interconnection in forming a long pipe assembly in the field.

In a preferred manufacturing process, as shown in FIGS. 4 and 5 to obtain optimum results, a long raw steel pipe 26 formed of a conventional unhardened ductile steel, is provided of a sufficient length to define a plurality of individual pipe sections to be interconnected into a flow line. A number of relatively short sleeves 16 are slipped or telescoped over the long raw pipe. For example, short sleeves which are 2–3 inches long have been attached to a pipe of 30 foot length at appropriate intervals. The sleeves 16 are then welded to the untreated pipe by welds 19. The raw pipe 26 with the welded sleeve16 thereon is then heated treated to form the hardened inner wall, as shown in FIG. 5. An outer induction heating coil 27 and an inner quench unit 28, as shown and more fully described in U.S. Pat. No. 5,379,805, is provided and the pipe 26 moved therethrough. The pipe 26 is thereby rapidly heated to the hardening temperature and a quenching solution applied immediately as the pipe moves from the coil 27 to establish the wall portions 8 and 9. The finished pipe 26 is then cut, such as by use of a plasma torch 29 to a precise length of each section as diagrammatically shown in FIG. 5. The plasma torch is preferred to allow a precise forming of the sleeve and pipe end in a common plan perpendicular to the axis of the individual pipe section. Again, although shown with the sleeve in a similar orientation, alternate sleeves may be attached in opposite orientation in forming pipe sections with connecting collars at the opposite ends.

Although described in the preferred construction and method of forming, the pipe section may be formed in any structure and method which introduces a heat insulating material between the pipe and the outer connecting member. For example, the sleeve may be spaced from the pipe by a fixed or removable isolation material, and then welded to the pipe. The pipe is then treated to form a hardened pipe and the connecting member then welded to the sleeve, with the inserted material removed or remaining in place. If removed, the sleeve could then engage the pipe in any manner as the heat isolation member and insulating material has produced the necessary protective function during the attachment of the connecting member.

A pipe as used hereinafter includes a single wall or a multiple wall pipe including an inner hardened wall portion and an outer relatively ductile portion. Thus, the pipe may be constructed with telescoped pipes, with the inner pipe a hardened pipe and the outer pipe a ductile pipe, or as a single wall with the respective portions as disclosed in the previously identified U.S. patents.

Although disclosed specifically in connection with pipe structures, the present invention is equally applicable to boom devices which may be mounted to a truck having a concrete pumping unit or other tubular members which require an inner hardened wall, or the like and a more ductile outer wall. The booms may also be formed in sections using pipe or tube sections with the isolating sleeves and collar members.

Various alternatives and embodiments are contemplated as being within the scope of the following claims particularly pointing out and distinctly claiming the subject matter regarded as the invention.

What is claimed is:

1. A pipe section comprising a pipe having a hardened inner wall portion and an outer ductile portion, said pipe having at least one couple end for securement to another member, a tubular sleeve having an inner diameter greater than the outer diameter of the pipe and located over the coupling end of the pipe, a weld securing the inner end of the sleeve to the exterior wall of the hardened pipe and forming a heat isolation area between the sleeve and the pipe, an outer collar member welded to said sleeve and projecting outwardly from said sleeve and the outer end of the pipe and configured for receiving of a clamp unit for interconnection of the pipe to another member, said heat isolation area substantially preventing transfer of heat from the weld area of the collar to the hardened pipe.

2. The pipe unit of claim 1 wherein said sleeve and pipe have the respective ends in a common plane perpendicular to the axis of the pipe, and said collar member is spaced slightly outwardly from said common plane.

3. The pipe unit of claim 1, wherein said collar is a high strength steel having a tubular connecting portion overlying a short outer end portion of the sleeve, and said collar weld is a filet weld between the outer end of the sleeve and the adjacent collar.

4. The pipe unit of claim 1, wherein said heat isolation area is substantially continuous throughout the length of said sleeve.

5. The pipe unit of claim 4 wherein said sleeve inner diameter is only slightly larger than the outer diameter of said pipe end.

6. The pipe unit of claim 1 wherein said isolation area is a gap substantially continuous through the length of said sleeve.

7. The pipe unit of claim 1, wherein said sleeve inner diameter establishes partial engagement with the outer surface of said pipe.

8. The pipe unit of claim 1 wherein said isolation area includes an isolation element between said sleeve and said pipe.

9. The pipe unit of claim 8, wherein said element is a high temperature paint.

10. The pipe unit of claim 8 wherein said element is a welding backup tape.

11. The pipe unit of claim 1 wherein said collar member has an inner diameter smaller than the inner diameter of said pipe and defining an inner recess extending outwardly of said pipe end and an insert liner having a tubular portion located within and substantially matching said inner recess, said insert liner having an outer flange abutting the end of said collar member, and an adhesive between said tubular portion and said recess and releasably bonding said liner to said collar.

12. The pipe unit of claim 11 wherein said inner liner is an high chrome alloy.

13. The pipe unit of claim 1 wherein said collar member includes an inner diameter less than said pipe, an insert liner within said recess collar member defining a collar opening forming an extension of said pipe.

14. The pipe unit of claim 1 wherein said pipe is a thin wall pipe having a single wall including said hardened inner wall portion and said outer ductile wall portion.

15. A coupling assembly for interconnection to a pipe end and configured for connecting of the pipe end to another pipe end through the use of a clamp unit, said coupling assembly comprising a thin sleeve having an inner diameter configured for movement of the sleeve over the pipe and in close proximity to said pipe, said sleeve formed of a ductile metal and configured for welded attachment to said pipe and, a collar member having a circular connecting portion configured for sliding engagement over the outer end of said sleeve and including a clamping portion projecting outwardly therefrom, said collar member configured and constructed to be welded to said sleeve and including an inner tubular cylindrical portion aligned with the internal diameter of the pipe to form a substantial extension of said inner diameter of said pipe.

16. The coupling assembly of claim 15 wherein the end of said sleeve and said pipe end are in substantially coplanar relation.

17. The coupling assembly of claim 16 wherein said sleeve is a thin wall ductile steel member of a substantially constant diameter.

18. The coupling assembly of claim 15 wherein said sleeve is substantially 0.125 inches thick.

19. A coupler for connecting a pipe section in a concrete flow line by a clamp assembly including a high strength collar connected to a pipe of the pipe section comprising:

a thin steel sleeve configured to pass over a pipe end of the pipe of the pipe section and said thin steel sleeve configured for welding of said sleeve to said pipe end and for welding said collar to said sleeve; and wherein said collar has a connecting portion and an end portion, said end portion of an inner diameter corresponding to the outer diameter of said sleeve and providing for telescoping of the connecting portion to the sleeve, and including said weld securing of said collar to said sleeve.

20. A pipe substantially configured to having a connecting member welded to at least one connection end of a subassembly to form a pipe section, said pipe subassembly comprising a pipe having a length of at least one pipe section, a heat isolating member telescoped over the pipe, a weld securing the heat isolating member to the pipe and forming a heat isolation area between the heat isolation member and the pipe, said subassembly being configured for hardening of the inner wall portion of the pipe with a remaining outer ductile wall portion for subsequent welding of said connecting member to said heat isolating member.

21. The pipe subassembly of claim 20 wherein said isolating member is a thin metal sleeve.

22. The pipe subassembly of claim 20 wherein said pipe is a single wall pipe.

23. The pipe assembly of claim 20 wherein said pipe includes an outer pipe member and an inner pipe member in close fitted relationship.

24. The pipe subassembly of claim 20 wherein said pipe is an elongated pipe of a length equal to a plurality of said pipe sections each having a connecting member welded to at least one end of each of said pipes of said elongated pipe, and heat isolating member welded to each of said assemblies of said elongated pipe.

25. The pipe subassembly of claim 20 wherein said pipe is an elongated pipe of a length equal to a plurality of said pipe sections, connecting members telescoped over the elongated pipe with one in alignment with at least one end of each of said plurality of said pipe sections, each connecting member being welded to said elongated pipe with a heat isolating means between said elongated pipe and said connecting members.

* * * * *